Patented Mar. 9, 1943

2,313,233

UNITED STATES PATENT OFFICE 2,313,233

PREPARATION OF BUTADIENE COPOLYMERS

Charles F. Fryling, Silver Lake, Ohio, assignor to The B. F. Goodrich Company, New York, N. Y., a corporation of New York No Drawing. Application June 26, 1941, Serial No. 399,940

16 Claims. (Cl. 260—84)

This invention relates to a process for the preparation of copolymers, and particularly to rubber-like copolymers prepared by the polymerization of a monomeric mixture of a butadiene and at least one other unsaturated compound copolymerizable therewith, and to the improved rubber-like or resinous products thereby obtained.

It is well known that the conditions such as time and temperature which are necessary for the preparation of butadiene copolymers, and the quality and usefulness of the copolymers so prepared are determined largely by the nature of the substances present along with the monomeric materials during the polymerization process. When the mixture of monomeric materials is polymerized either in a homogeneous system or in emulsion in the absence of other substances which influence the polymerization reaction, the polymerization may not occur at all and if it does it requires an extremely long time, usually several days or weeks, it must be carried out at relatively high temperatures, above 50° C., and the products are hard, non-plastic, non-tacky, unworkable materials which are substantially worthless as commercial rubber-like synthetics. If, however, an oxygen-yielding compound such as oxygen itself, hydrogen peroxide, benzoyl peroxide, potassium persulfate, sodium perborate or the like is added to the monomeric materials before polymerization, these compounds through some chemical action cause the polymerization to begin and enable the polymerization to be carried out in a shorter time and at a lower temperature. Because of this action these compounds have often been termed "polymerization catalysts" but the term "polymerization initiators" is now preferably applied to such compounds since they are at least partially used up during the polymerization process. Although oxygen-yielding initiators do decrease the time and temperature necessary for polymerization, the products formed are often deficient in plasticity and tackiness and extremely difficult to work on the mill. The object of this invention therefore is to provide a method whereby soft, plastic, butadiene copolymers may be prepared in a short time, at a low temperature, and in good yield.

In accordance with this invention it has been found that soft plastic butadiene copolymers may be prepared by adding a small amount of a diazo amino aryl compound to the monomeric materials before polymerization. This result may be obtained either in the presence or absence of an oxygen-yielding polymerization initiator. In fact, plastic copolymers are obtained in good yield, in a short time and at a low temperature even when the diazo amino aryl compound is employed as the sole substance which influences the polymerization reaction. Thus, diazo amino aryl compounds when added to monomeric mixtures are effective both in initiating the polymerization and in increasing the softness and plasticity of the polymerization products. Hereinafter, these compounds will sometimes be referred to as polymerization initiators.

Among the diazo amino aryl compounds which may be employed in this invention are diazo amino benzene

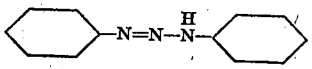

ortho, meta and para diazo amino toluenes, the diazo amino xylenes, toluene azo benzyl amino (1-toluyl 3-benzyl triazene)

$CH_3—C_6H_4—N=N—NH—CH_2—C_6H_5$, 4-methyl diazo amino benzene (1-p-toluyl 3-phenyl triazene)

para benzene azo tolu benzyl amine (1-(p-methyl diphenyl) 3-benzyl triazene)

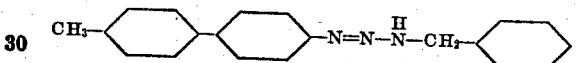

5 diazo amino pseudo cumene

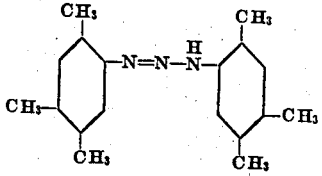

para toluene azo 5-pseudo cumidine

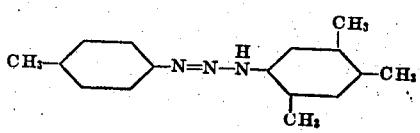

benzene azo para cuminyl amine benzene azo tetrahydro naphthylamine, benzene diazo amino naphthalene, alpha and beta diazo amino naphthalenes and the like.

These diazo amino aryl compounds may be employed in the polymerization of monomeric mixtures containing a butadiene compound by which is meant butadiene 1—3 and its homologs and analogs which polymerize in essentially the same manner such as isoprene, 2,3-dimethyl butadiene, piperyline, chloroprene and the like, and also containing at least one other unsaturated compound copolymerizable with a butadiene compound. Such other unsaturated compounds, or comonomers, are in general unsaturated organic compounds containing the polymerizable structure

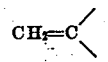

where at least one of the dangling valencies is connected to an electron attracting group, that is, a group which substantially increases the electrical dissymmetry or polar character of the compound. Among such comonomers there may be mentioned ring-substituted vinyl compounds such as styrene, vinyl naphthalene, vinyl furane and the like; acrylo nitriles such as acrylonitrile, methacrylonitrile and the like; esters of acrylic acid such as methyl acrylate, ethyl acrylate, butyl acrylate, isobutyl acrylate, isoamyl acrylate and the like; esters of substituted acrylic acids such as methyl methacrylate, ethyl methacrylate, 2-ethyl-hexyl methacrylate, butyl methacrylate, methyl ethacrylate isoamyl ethacrylate and the like; vinyl ethers such as methyl vinyl ether; vinyl ketones such as methyl vinyl ketone; vinylidene chloride; vinyl ethinyl alkyl carbinols such as vinyl ethinyl ethyl carbinol; and other unsaturated hydrocarbons, esters, ketones, acids, alcohols, ethers and the like. The diazo amino aryl initiators of this invention are especially useful when polymerizing a monomeric mixture containing a butadiene compound such as butadiene-1,3, isoprene and 2,3-dimethyl butadiene and another monomer selected from the class consisting of ring substituted vinyl compounds, acrylo nitriles and esters of acrylic acids, since these monomeric materials are readily available at reasonable cost. The monomeric mixture should preferably, but not essentially, contain a larger proportion by weight of the butadiene compound than of the other monomer.

In the practice of the invention a small amount of the diazo amino aryl compound is added to the monomeric mixture and polymerization is then effected by any of the well known methods such as by polymerization in homogeneous systems or by polymerization in aqueous emulsion. In the emulsion polymerization process, which is at present preferred, the monomeric mixture and the diazo amino aryl compound are emulsified with water by the use of a suitable emulsifying agent and polymerization is then effected by agitating the emulsion at a temperature from about 20–60° C. until polymer is formed, this usually requiring from 10 to 100 hours. Suitable emulsifying agents are, for example, fatty acid soaps such as sodium oleate, sodium palmitate, sodium myristate, or the like and synthetic saponaceous materials such as sodium lauryl sulfate, sodium isobutyl naphthalene sulfonate or the like.

The amount of the diazo amino aryl compound which is used in the polymerization process will, in general, be quite small in comparison to the amount of the materials polymerized. For most purposes amounts varying from 0.2 to 2% of the initiator based on the total weight of the monomeric material should be used. In particular, amounts varying from ⅓ to 1¼% are most effective. These amounts are not critical however and variation outside the preferred range is permissible.

As a specific example of one method of carrying out this invention a mixture of butadiene-1,3 and acrylonitrile is polymerized in aqueous emulsion, the charge being made up as follows:

| | Parts |
|---|---|
| Butadiene-1,3 | 75 |
| Acrylonitrile | 25 |
| Emulsifying solution (5% aqueous solution of sodium palmitate) | 150 |
| Diazo amino benzene | 1.5 |

The emulsion is agitated at 60° C. for 40 hours, at the end of this time the polymerization being complete. Coagulation of the latex-like dispersion resulting from this process gives a 96% yield of a soft plastic rubber-like copolymer. The coplymer possesses excellent tackiness and is easily worked on roll mills. When the above example is repeated in the absence of the diazo amino benzene, several days' agitation at 60° C. are required in order for polymer to be formed. Moreover, the yield of polymer is low and the product is a hard, non-tacky solid which is difficult to work on the mill. This example shows that diazo amino benzene is an effective initiator of polymerization since a 90% yield of polymer is obtained in only 40 hours, and also shows the remarkable improvement in polymer properties effected by the presence of the diazo amino benzene.

In another embodiment of the invention the above example is repeated except that 0.9% by weight of benzoyl peroxide and 0.7% by weight of diazo amino benzene are added to the mixture of monomeric together with the emulsifying solution. A good yield of a soft plastic rubber-like copolymer is obtained after polymerization for 48 hours at 60° C. When only benzoyl peroxide is employed as the initiator the product is dry and difficult to mill. This example shows that diazo amino benzene may be employed together with another polymerization initiator, the result being that the properties of the copolymers are improved by the addition of the diazo amino benzene.

In still another embodiment of the invention a mixture of 30 parts of styrene and 70 parts of butadiene-1,3 are polymerized in aqueous emulsion in presence of 1% by weight of diazo amino benzene as the sole polymerization initiator. A good yield of a plastic, tacky, rubber-like copolymer is obtained after polymerizing for 120 hours at 30° C. This example again illustrates the use of diazo amino benzene as the sole polymerization initiator.

Similar results may be obtained by the use of other diazo amino aryl compounds and when polymerizing other monomeric materials. In addition it is to be understood that other substances may be employed in the polymerization recipe without altering the effect of the initiators of polymerization herein employed. Thus, in addition to other initiators of polymerization, modifiers of polymerization, accelerators of polymerization, catalysts of polymerization as well as other substances which exert some other effect on the course of the polymerization or the properties of the product may be added together with the monomeric materials and the diazo amino aryl compounds of this invention either before, after or during the polymerization if desired, the effect being that each substance functions in its own way to improve the process or the products. Since the diazo amino aryl compounds are themselves good initiators of polymerizations, it is unnecessary to use other initiators therewith and their use as the sole initiator is often preferred. It is also to be understood that the method and conditions of polymerization may be varied. Accordingly, the invention is not intended to be limited except by the spirit and scope of the appended claims.

I claim:

1. In a process of polymerizing a monomeric mixture containing a butadiene compound and at least one other unsaturated compound which contains a

group and is copolymerizable therewith, the step which comprises adding a diazo amino aryl compound to the monomeric mixture before polymerization.

2. In a process of polymerizing a monomeric mixture containing a butadiene compound and at least one other unsaturated compound which contains a

group and is copolymerizable therewith, the step which comprises adding diazo amino benzene to the monomeric mixture before polymerization.

3. A method of improving the properties of resins prepared by treating a mixture of a butadiene compound and a monomer selected from the group consisting of ring-substituted vinyl compounds, acrylo nitriles and esters of acrylic acids, which comprises adding a diazo amino aryl compound to the monomeric mixture before polymerization.

4. A method of improving the properties of resins prepared by treating a mixture of butadiene and a monomer selected from the group consisting of ring-substituted vinyl compounds, acrylo nitriles and esters of acrylic acids which comprises adding a diazo amino phenyl compound to the monomeric mixture before polymerization.

5. A method of improving the properties of resins prepared by copolymerizing a mixture of a butadiene compound and a monomer selected from the group consisting of ring-substituted vinyl compounds, acrylo nitriles and esters of acrylic acids which comprises adding from 0.25 to 1.25% of the total weight of the monomers of a diazo amino aryl compound to the mixture and then polymerizing.

6. A method of improving the properties of resins prepared by treating a mixture of a butadiene compound and a monomer selected from the group consisting of ring-substituted vinyl compounds, acrylonitriles and esters of acrylic acids which comprises adding diazo amino benzene to the monomeric mixture before polymerization.

7. A method of improving the properties of resins prepared by treating a mixture of butadiene and acrylonitrile which comprises adding diazo amino benzene to the mixture of monomers and then polymerizing.

8. A method of improving the properties of resins prepared by treating a mixture of a butadiene compound and acrylo nitrile which comprises adding from ⅓ to 1¼% on the total monomer of diazo amino benzene to the mixture and then polymerizing.

9. A method of improving the properties of resins prepared by treating a mixture of butadiene and acrylo nitrile which comprises adding from ⅓ to 1¼% on the total monomer of diazo amino benzene to the mixture and then polymererizing.

10. A method of improving the properties of resins prepared by treating a mixture of butadiene and styrene which comprises adding from ⅓ to 1¼% on the total monomer of diazo amino benzene to the mixture and then polymerizing.

11. The process which comprises polymerizing in the form of an aqueous emulsion a monomeric mixture containing a butadiene compound and at least one other unsaturated compound which contains a

group and is copolymerizable therewith, in presence of a diazo amino aryl compound.

12. The process which comprises polymerizing in the form of an aqueous emulsion a monomeric mixture of butadiene-1,3 and acrylonitrile in presence of diazo amino benzene as the sole polymerization initiator.

13. The process which comprises polymerizing in the form of an aqueous emulsion a monomeric mixture of butadiene-1,3 and styrene in presence of diazo amino benzene as the sole polymerization initiator.

14. The process which comprises polymerizing in the form of an aqueous emulsion a monomeric mixture of the butadiene-1,3 and methyl methacrylate in presence of diazo amino benzene as the sole polymerization initiator.

15. The process which comprises polymerizing in the form of an aqueous emulsion a mixture of butadiene and acrylonitrile in the presence of a diazo amino aryl compound.

16. The process which comprises polymerizing in the form of an aqueous emulsion a mixture of butadiene and styrene in the presence of a diazo amino aryl compound.

CHARLES F. FRYLING.